(12) United States Patent
Nakajima et al.

(10) Patent No.: US 8,118,064 B2
(45) Date of Patent: Feb. 21, 2012

(54) FIBER REINFORCED PLASTIC PIPE AND POWER TRANSMISSION SHAFT EMPLOYING THE SAME

(75) Inventors: Tatsuo Nakajima, Iwata (JP); Arito Matsui, Iwata (JP); Takashi Nishimoto, Sagamihara (JP); Go Itohiya, Sagamihara (JP); Hajime Asai, Tokyo-to (JP); Tsuneo Takano, Toyohashi (JP)

(73) Assignees: NTN Corporation, Osaka (JP); Asahi Glass Matex Co., Ltd., Kanagawa (JP); Mitsubishi Rayon Co., Ltd., Tokyo (JP)

( * ) Notice: Subject to any disclaimer, the term of this patent is extended or adjusted under 35 U.S.C. 154(b) by 1757 days.

(21) Appl. No.: 10/058,064

(22) Filed: Jan. 29, 2002

(65) Prior Publication Data

US 2002/0117228 A1 Aug. 29, 2002

(30) Foreign Application Priority Data

Feb. 7, 2001 (JP) .................................. 2001-31005

(51) Int. Cl.
*F16L 9/14* (2006.01)
(52) U.S. Cl. ......... 138/153; 138/151; 138/114; 464/181
(58) Field of Classification Search .................. 138/153, 138/151, 114; 464/181
See application file for complete search history.

(56) References Cited

U.S. PATENT DOCUMENTS

| | | | | |
|---|---|---|---|---|
| 3,002,534 | A | * | 10/1961 | Noland .......................... 138/141 |
| 3,775,520 | A | * | 11/1973 | Ram et al. .................. 423/447.7 |
| 3,900,556 | A | * | 8/1975 | Clarke ....................... 423/447.7 |
| 3,954,950 | A | * | 5/1976 | Ram et al. .................. 423/447.6 |
| 4,171,626 | A | * | 10/1979 | Yates et al. ..................... 464/181 |
| 4,238,540 | A | * | 12/1980 | Yates et al. ..................... 428/35.9 |
| 4,248,062 | A | * | 2/1981 | McLain et al. ................ 464/181 |
| 4,265,951 | A | * | 5/1981 | Yates et al. ..................... 428/35.9 |
| 4,272,971 | A | * | 6/1981 | Loyd et al. ..................... 464/181 |
| 4,657,795 | A | * | 4/1987 | Foret .......................... 280/281.1 |
| 4,888,224 | A | * | 12/1989 | Zackrisson et al. .......... 428/35.9 |
| 5,683,641 | A | * | 11/1997 | Jaskowiak .................... 264/267 |

(Continued)

FOREIGN PATENT DOCUMENTS

EP 0 509 480 A1 4/1992

(Continued)

OTHER PUBLICATIONS

Japanese Office Action darted Apr. 26, 2011 in counterpart Japanese Application No. 2001-031005.

(Continued)

*Primary Examiner* — James Hook
(74) *Attorney, Agent, or Firm* — Arent Fox LLP (57) ABSTRACT

A fiber reinforced plastic pipe is provided to prevent it from being damaged and make full use of its practical performance when the fiber reinforced plastic pipe, reduced in thickness and increased in diameter by pultrusion process, is reduced in the circumferential direction and inserted into a metal pipe. The fiber reinforced plastic pipe, reduced in thickness and increased in diameter by pultrusion process, includes a fiber bundle spun and aligned in the longitudinal direction, and circumferential reinforced fiber sheet provided at least on one of the outer and inner surface layers. The circumferential reinforced fiber sheet is inserted into the metal pipe to form a power transmission shaft such as an intermediate shaft for use with a propeller shaft or a drive shaft.

20 Claims, 9 Drawing Sheets

U.S. PATENT DOCUMENTS

| | | | |
|---|---|---|---|
| 5,881,775 A * | 3/1999 | Owen et al. | 138/149 |
| 5,921,285 A * | 7/1999 | Quigley et al. | 138/125 |
| 6,241,062 B1 * | 6/2001 | Enright | 188/378 |
| 6,287,209 B1 * | 9/2001 | Nakajima et al. | 464/181 |
| 6,350,204 B1 * | 2/2002 | Yasui et al. | 464/181 |
| 6,409,606 B1 * | 6/2002 | Nakajima et al. | 464/181 |
| 6,464,591 B1 * | 10/2002 | Nakajima | 464/181 |
| 6,517,440 B2 * | 2/2003 | Russell | 464/179 |
| 6,561,229 B2 * | 5/2003 | Wellman et al. | 138/146 |

FOREIGN PATENT DOCUMENTS

| | | |
|---|---|---|
| EP | 0 774 595 A2 | 5/1997 |
| FR | 2 797 313 | 2/2001 |
| GB | 669019 | 4/1952 |
| JP | 58-81229 U | 6/1983 |
| JP | 64-29321 U | 2/1989 |
| JP | 01-108031 A | 4/1989 |
| JP | 1-91117 U | 6/1989 |
| JP | 2-57712 A | 2/1990 |
| JP | 04-197740 A | 7/1992 |
| JP | 5-106629 A | 4/1993 |
| JP | 07-167211 A | 7/1995 |
| JP | 11-78564 A | 3/1999 |
| JP | 2001-27220 A | 1/2001 |

OTHER PUBLICATIONS

Partial English Language Translation of Citattion No. CA.

* cited by examiner

FIBER REINFORCED PLASTIC PIPE AND POWER TRANSMISSION SHAFT EMPLOYING THE SAME

BACKGROUND OF THE INVENTION

This invention was made under a Joint Research Agreement between NTN Corporation, Japan, Asahi Glass Matex Co. Ltd., Japan, and Mitsubishi Rayon Co. Ltd., Japan. The term of the Joint Research Agreement is from Dec. 1, 2000 to Mar. 31, 2002.

1. Field of the Invention

The present invention relates to a fiber reinforced plastic pipe for use such as with a propeller shaft or a drive shaft which constitutes part of the power transmission system of a vehicle. The present invention also relates to a power transmission shaft incorporating the fiber reinforced plastic pipe.

2. Description of the Related Art

Those shafts that constitute the power transmission system of a vehicle include a propeller shaft for transmitting power from the gearbox to the reduction gear, and a drive shaft for coupling the engine and the hub joint. Any of the shafts is provided at the ends thereof with universal joints, and constructed to respond to variations in length and angle resulting from changes in relative position between the gearbox and the reduction gear or between the engine and the hub joint.

Figure 8:
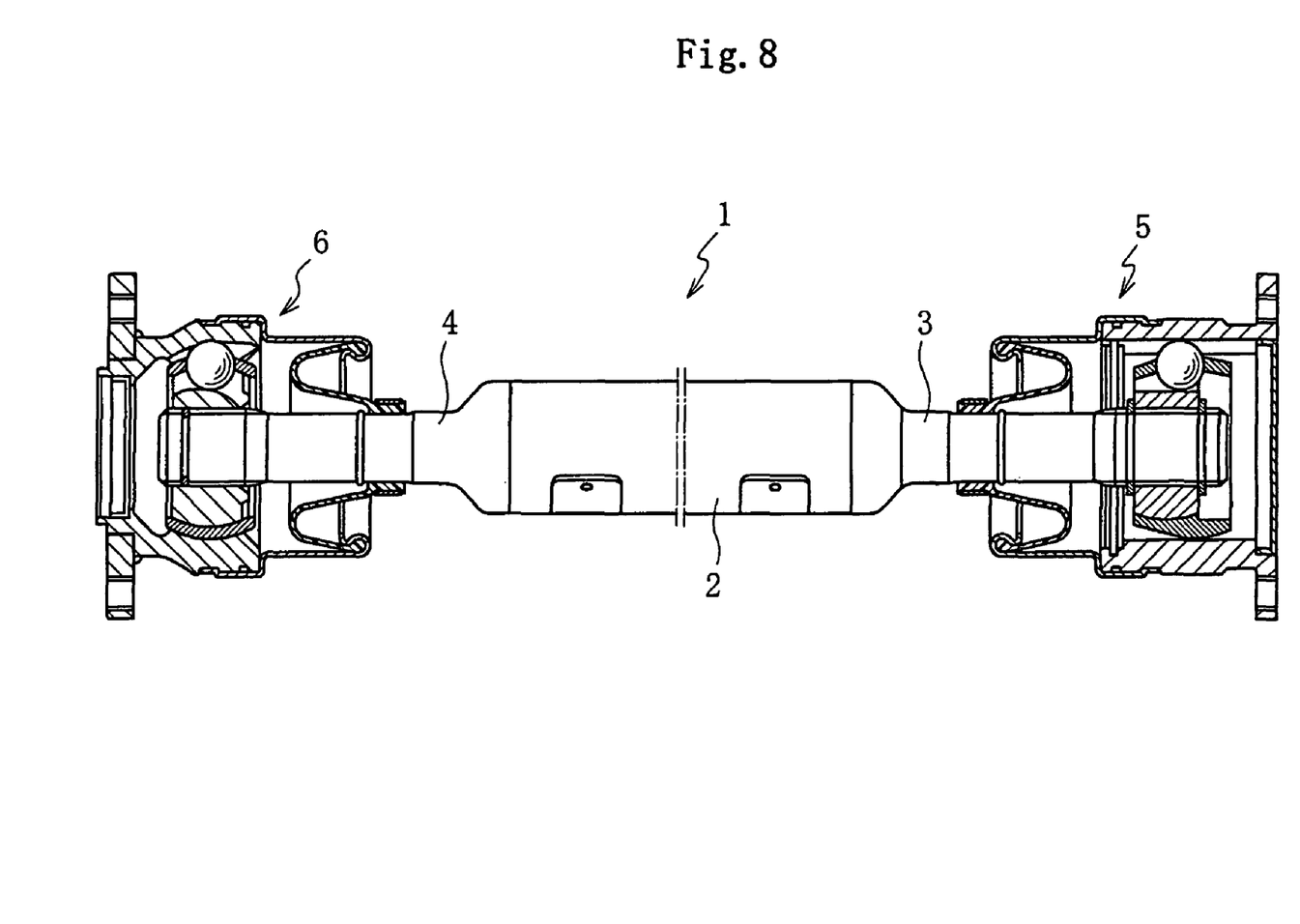
FIG. 8 is an external view illustrating an example of a propeller shaft.
Figure 9A:
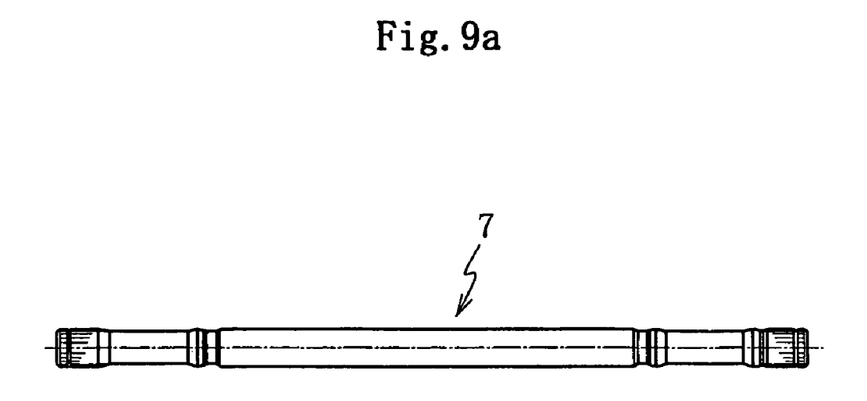
FIG. 9a is a front view illustrating an example of an intermediate shaft for use with a drive shaft.
Figure 9B:
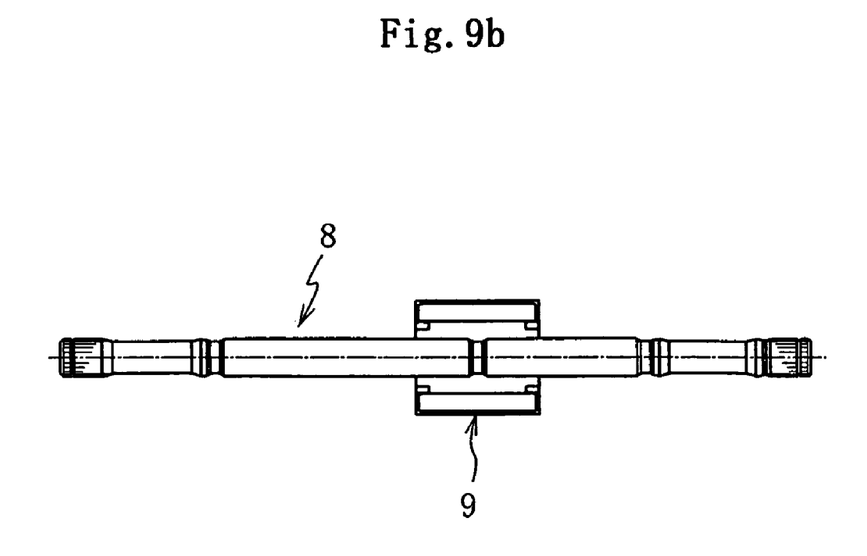
FIG. 9b is a front view illustrating another example of an intermediate shaft for use with a drive shaft.

FIG. 8 is a view illustrating an example of a power transmission shaft, showing the overall view of a propeller shaft 1. The propeller shaft 1 is provided with stub shafts 3 and 4, a type of metal joint elements, which are jointed to the both ends of an intermediate shaft 2. The stub shafts 3 and 4 mate with the joint inner ring of constant velocity joints 5 and 6 by means of splines or serrations. FIGS. 9a and 9b are views illustrating another example of a power transmission shaft, showing an intermediate shaft of the drive shaft. FIG. 9a illustrates an intermediate shaft 7 provided with no dynamic damper, and FIG. 9b illustrates an intermediate shaft 8 provided with a dynamic damper 9 for preventing vibrations.

It has been a conventional process to employ hollow or solid steel shafts for the intermediate shaft 2 of the propeller shaft 1 and the intermediate shafts 7, 8 of the drive shaft. From the viewpoint of flexural rigidity, an elongated intermediate shaft that constitutes the power transmission shaft needs to be provided at the intermediate portion thereof with a support bearing or a dynamic damper for preventing vibrations. Accordingly, improvements have been required for the shaft in weight and cost, and thus it has been difficult to provide an elongated shaft.

In view of these improvements, it has been suggested to employ a hollow pipe formed of a fiber reinforced plastic (hereinafter referred to as the FRP pipe) and having a high flexural rigidity in combination with a metal pipe. This improves the flexural rigidity of the intermediate shaft to eliminate the support bearing or the dynamic damper for preventing vibrations at the intermediate portion, thereby reducing the shaft in weight and cost and making it possible to provide an elongated shaft.

For example, the FRP pipe can be reduced in thickness and increased in diameter by pultrusion process. By pultrusion process, a plurality of fiber bundles are spun and hardened continuously while being aligned in the longitudinal direction, thereby making it possible to efficiently manufacture a pipe-shaped molded product having a uniform cross-section. To combine the FRP pipe obtained by the pultrusion process with a metal pipe, such a typical technique has been processed in which the FRP pipe is mechanically press-fitted into the metal pipe.

That is, it is conceivable that the FRP pipe is inserted into the metal pipe and then the outer circumference of the metal pipe is reduced in diameter by plastic-working in order to fix the FRP pipe to the metal pipe. Alternatively, to fix the FRP pipe to the metal pipe, an adhesive can be injected into the gap between the metal pipe and the FRP pipe. However, in a case where the FRP pipe and the metal pipe are formed in the shape of a simple cylinder and have a tolerance of size, respectively, it is necessary to match the dimensions with each other to control subtle press-fitting or press-fit pressures in the process, thereby making the assembly extremely complicated.

In contrast to this, using an FRP pipe having a slit in the axial direction would eliminate the aforementioned subtle matching for press-fitting and reduce the press-fit pressure. In other words, the FRP pipe can be reduced in diameter in the circumferential direction when the FRP pipe is incorporated into the metal pipe. This allows for a plastic deformation by the width of the slit, thereby making the assembly considerably easier in comparison with a case where a cylindrical pipe having no slit is press-fitted into the metal pipe.

Furthermore, suppose that the FRP pipe with a slit is formed to have an outer diameter greater than the inner diameter of the metal pipe, so that the apparent outer diameter of the FRP pipe is less than the inner diameter of the metal pipe when the FRP pipe is elastically deformed by the width of the slit in the circumferential direction. In this case, after the assembly, the FRP pipe will expand inside the metal pipe back to the original outer diameter provided upon its formation. This elastic recovery force serves to press the FRP pipe against the metal pipe, thereby making it possible to securely fix the FRP pipe to the metal pipe.

However, in a case where upon inserting the FRP pipe into the metal pipe, the FRP pipe is so damaged due to cracks as not to make use of its practical performance, the effectiveness of the aforementioned various techniques is ruined, making it difficult to employ the FRP pipe for use with the power transmission shaft.

To form the FRP pipe by pultrusion process, it is a common process to draw all fiber bundles being aligned in the longitudinal direction of the pipe in order to make full use of the mechanical properties of the fibers that are used for the FRP pipe. However, an FRP pipe which is reduced in thickness and increased in diameter by pultrusion process makes such a problem noticeable that the FRP pipe is sensitive to crushing force exerted from the circumference, thereby causing longitudinal or other cracks to readily develop.

Furthermore, when the FRP pipe with a slit is elastically deformed by the width of the slit and thus reduced in diameter, the maximum tensile stress occurs on an outer surface of the pipe, the outer surface being opposite to the slit with respect to the center of the pipe. This tensile stress increases in proportion to the width of the slit of the FRP pipe, thereby increasing the possibility of occurrence of cracks. In particular, reinforcement fibers spun being aligned in the longitudinal direction of the pipe may easily raise the problem that longitudinal or other cracks are also caused by the stress developed due to thermal expansion in addition to the stress caused by an external force.

SUMMARY OF THE INVENTION

It is therefore an object of the present invention to prevent an FRP pipe from being damaged and make full use of its practical performance, when the FRP pipe reduced in thickness and increased in diameter by pultrusion process is reduced in diameter in the circumferential direction and then inserted into a metal pipe. The present invention has the following features.

1. According to a first aspect of the present invention, an FRP pipe reduced in thickness and increased in diameter by pultrusion process, comprises a fiber bundle spun and aligned in the longitudinal direction, and circumferential reinforced fiber sheet provided at least either on an outer surface layer or on an inner surface layer. In this invention, the fiber bundle is spun and aligned in the longitudinal direction of the pipe, thereby allowing for making full use of the mechanical properties of the fibers for use with the FRP pipe. The FRP pipe is also provided with the circumferential reinforced fiber sheet at least on either the outer surface layer or the inner surface layer of the FRP pipe, thereby making it possible to prevent tensile strain from developing in the circumferential direction of the pipe. Consequently, this makes the pipe robust against the crushing force exerted from the circumference and less prone to longitudinal cracks or other cracks.

2. According to a second aspect of the present invention, an FRP pipe reduced in thickness and increased in diameter by pultrusion process, comprises a fiber bundle spun and aligned in the longitudinal direction, and circumferential reinforced fiber sheet provided at least either on an outer surface layer or on an inner surface layer, and has a slit, capable of being reduced in diameter along the circumference, provided in the longitudinal direction. In this arrangement, the fiber reinforced plastic pipe can be inserted into a metal pipe. In this invention, upon incorporating the FRP pipe into the metal pipe, reducing the FRP pipe in diameter in the circumferential direction makes it possible to elastically deform the pipe by the width of the slit. This makes the assembly considerably easier in comparison with a case where a cylindrical pipe with no slit is press-fitted into the metal pipe. Consequently, it is possible to provide an FRP pipe which enables to make full use of its practical performance without damaging the FRP pipe.

3. According to a third aspect of the present invention, in a power transmission shaft comprising a metal joint element and a metal pipe jointed to each other, an FRP pipe is inserted into the metal pipe, the FRP pipe being reduced in thickness and increased in diameter by pultrusion process, comprising a fiber bundle spun and aligned in the longitudinal direction, and circumferential reinforced fiber sheet provided at least either on an outer surface layer or on an inner surface layer. In this invention, the FRP pipe having a high flexural rigidity is disposed inside the metal pipe, thereby making it possible to improve the flexural rigidity of the power transmission shaft. This allows for eliminating a support bearing at the intermediate portion or a dynamic damper for preventing vibrations, thereby reducing the shaft in weight and cost and providing an elongated shaft.

4. According to a fourth aspect of the present invention, in a power transmission shaft comprising a metal joint element and a metal pipe jointed to each other, an FRP pipe is inserted into the metal pipe, the FRP pipe being reduced in thickness and increased in diameter by pultrusion process, comprising a fiber bundle spun and aligned in the longitudinal direction, and circumferential reinforced fiber sheet provided at least either on an outer surface layer or on an inner surface layer, and having a slit, capable of being reduced in diameter along the circumference, provided in the longitudinal direction. In this invention, upon incorporating the FRP pipe into the metal pipe, reducing the FRP pipe in diameter in the circumferential direction makes it possible to elastically deform the pipe by the width of the slit. This makes the assembly considerably easier in comparison with a case where a cylindrical pipe with no slit is press-fitted into the metal pipe.

Consequently, it is possible to employ welding, which is robust and provides for a long-term service reliability, to joint the metal pipe and the joint element together. This allows for using the power transmission shaft for a car equipped with a constant velocity joint. In addition to the use for cars, the power transmission shaft can also be used advantageously for ships, various types of industrial machines, and aircraft.

5. In the FRP pipe, the tensile elasticity of fibers that form the fiber bundle of the FRP pipe is 196 GPa or more. This makes it possible to increase the first-order flexural resonance frequency of the FRP pipe. To this end, it is preferable to use PAN-based carbon fibers which have such a tensile elasticity.

6. In the FRP pipe, the tensile elasticity of fibers that form the circumferential reinforced fiber sheet of the FRP pipe is 58.8 GPa or more. This makes it easy to prevent the tensile strain from developing in the circumferential direction of the pipe.

7. The FRP pipe is adapted such that the basis weight (this may be referred to as FAW (Fiber Area Weiht) in this technical field which means weight per unit area) of the circumferential reinforced fiber sheet of the FRP pipe is within the range of 100 g/m² to 600 g/m². This facilitates the continuous formation of the FRP pipe by pultrusion process.

8. In the FRP pipe, the thickness of the circumferential reinforced fiber sheet of the FRP pipe is within the range of 0.05 mm to 1.0 mm. This facilitates the continuous formation of the FRP pipe by pultrusion process.

It is preferable to use glass fibers or PAN-based carbon fibers as the fibers that constitute the circumferential reinforced fiber sheet of the FRP pipe set forth in items 6 to 8.

9. In the power transmission shaft, the FRP pipe is provided with a slit having a width of 0.01% or more and 40% or less of the outer circumference of the FRP pipe in its natural state. This eliminates the matching of the outer diameter of the FRP pipe and the inner diameter of the metal pipe for controlling the subtle press-fitting and the press-fit pressure in the process. This also makes it possible to provide a well balanced condition for the high-speed rotation of the power transmission shaft.

10. In the power transmission shaft, the slit has a bias angle within ±30 degrees with respect to the axial direction of the FRP pipe. This makes it possible to improve the flexural rigidity of the power transmission shaft.

11. In the power transmission shaft, the value of $D_1/D_2$ is greater than 1 and 1.3 or less, where $D_1$ is the outer diameter of the FRP pipe and $D_2$ is the inner diameter of the metal pipe. In this context, the FRP pipe is so formed as to have an outer diameter that is greater than the inner diameter of the metal pipe, so that the FRP pipe has an apparent outer diameter less than the inner diameter of the metal pipe when having been elastically deformed by the slit width in the circumferential direction. Consequently, after having been incorporated into the metal pipe, the FRP pipe expands attempting to restore its original outer diameter provided upon its formation inside the metal pipe. This makes it possible to fix the FRP pipe to the metal pipe.

12. In the power transmission shaft, the FRP pipe has a layered structure of 20 layers or less. This eliminates complicated preparation for formation, thereby making it possible to improve the mass productivity of the FRP pipe.

13. In the power transmission shaft, the value of FL/PL is 0.1 or more and 1.0 or less, where PL is the length of the metal pipe and FL is the length of the FRP pipe. This makes it possible to ensure the flexural rigidity of the power transmission shaft.

14. In the power transmission shaft, the value of $t_2/t_1$ is 0.01 or more and 10 or less, where $t_1$ is the thickness of the metal pipe and $t_2$ is the thickness of the FRP pipe. This makes it possible to ensure the flexural rigidity that satisfies the flexural natural frequency of the power transmission shaft.

15. The FRP pipe can be fixed to the metal pipe by reducing the metal pipe in diameter along the outer circumference of the metal pipe by means of plastic-working or by with adhesive, with the FRP pipe being inserted in the metal pipe. In the latter case where adhesive is used, a recessed portion for accommodating adhesive may be provided on the outer circumference of the FRP pipe or only on the inner circumference of the metal pipe, or on both the outer circumference of the FRP pipe and the inner circumference of the metal pipe. This makes it possible to positively form an adhesive layer between the outer circumference of the FRP pipe and the inner circumference of the metal pipe after the pipes have been assembled.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Figure 1A:
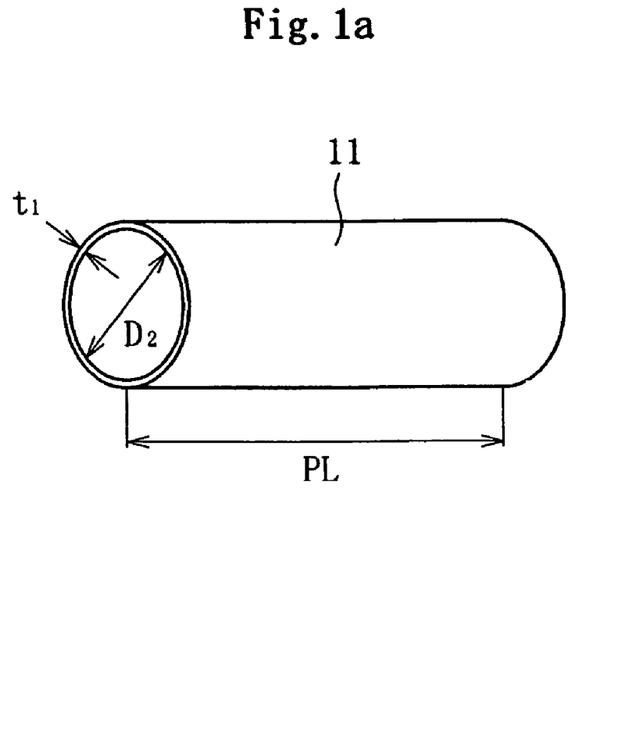
FIG. 1a is a perspective view illustrating a metal pipe.
Figure 1B:
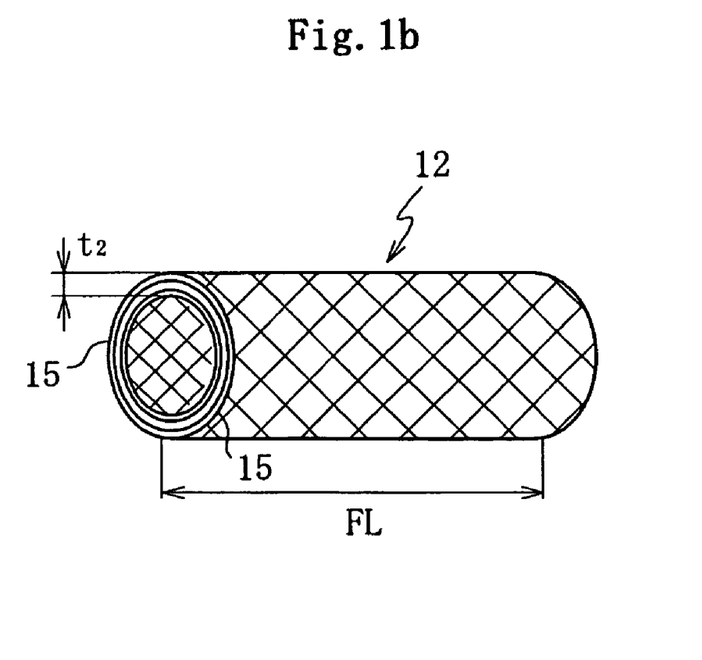
FIG. 1b is a perspective view illustrating an FRP pipe.
Figure 2A:
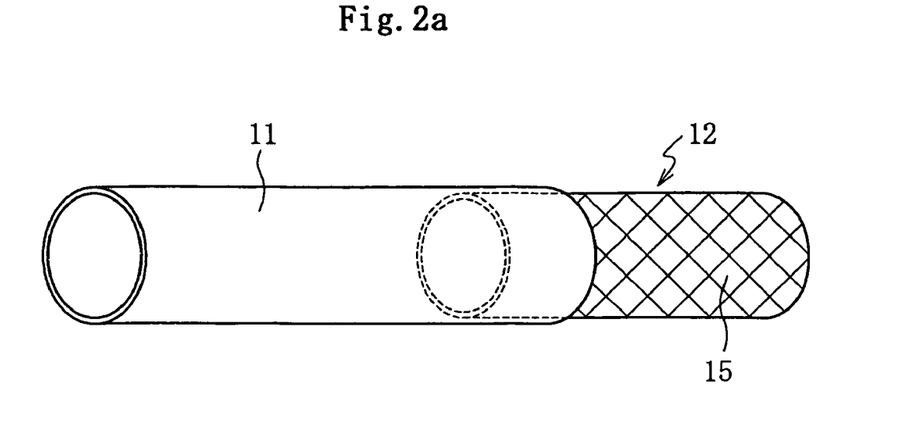
FIG. 2a is a perspective view illustrating a step in which an FRP pipe is press-fitted into a metal pipe.
Figure 2B:
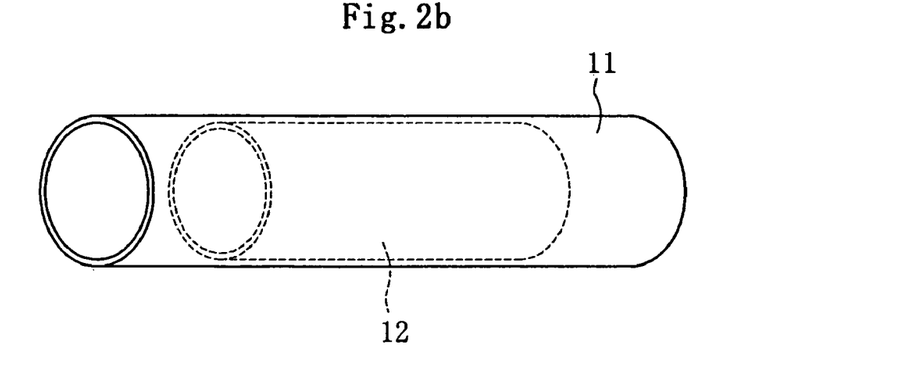
FIG. 2b is a perspective view illustrating a metal pipe in which an FRP pipe has been press-fitted.
Figure 2C:
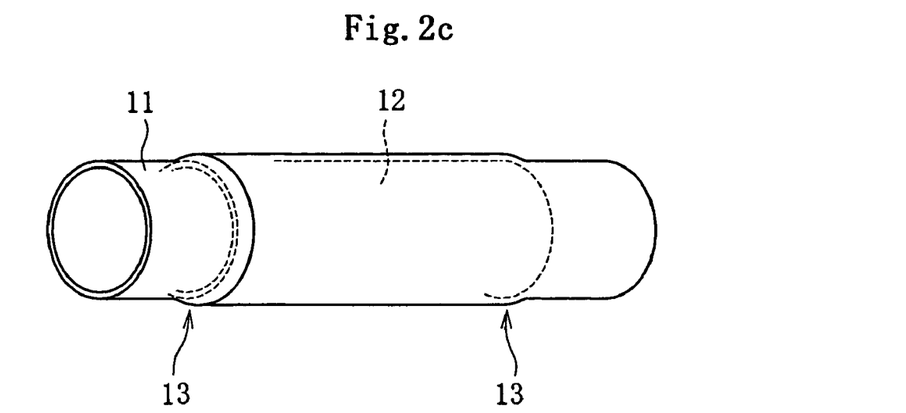
FIG. 2c is a perspective view illustrating a metal pipe both ends of which have been spun.

A metal pipe 11 shown in FIG. 1a is used in combination with an FRP pipe 12 shown in FIG. 1b. As shown in FIGS. 2a to 2c, the FRP pipe 12, which has been reduced in thickness and increased in diameter by pultrusion process, is inserted into the metal pipe 11, for use with a power transmission shaft as its intermediate shaft 2, 7, and 8 (see FIGS. 8 and 9). The FRP pipe 12 having a high flexural rigidity is disposed inside the metal pipe 11, thereby making it possible to improve the flexural rigidity of the power transmission shaft. This allows for eliminating a support bearing at the intermediate portion or a dynamic damper for preventing vibrations, thereby reducing the shaft in weight and cost and providing an elongated shaft.

In addition to this, the FRP pipe 12 is inserted into the metal pipe 11 to form the power transmission shaft. This makes it possible to provide the shaft with high durability sufficiently enough to withstand a large shearing force for the transmission of power because the shaft has a metallic joint portion at the end portion thereof available for jointing with a joint element. That is, it is possible to employ a joint method, perfect in reliability, such as welding or friction welding for coupling between the metal pipe 11 and the joint element. This makes it possible to perfectly prevent circumferential sliding or axial dislodging, thereby providing the joint portion with long-term reliability.

Furthermore, it is also possible to stack FRP layers, in combination, of the FRP pipe 12 inserted into the metal pipe 11, the FRP layers having the fibers disposed at angles of 0 degree and ±45 degrees to the axial direction of the metal pipe 11. This makes it possible to control flexural rigidity and torsional rigidity. It is also acceptable to control the flexural rigidity, torsional rigidity, and resistance to buckling by means of the length of the FRP pipe 12 inserted into the metal pipe 11, the thickness ratio between the metal pipe 11 and the FRP pipe 12, the elasticity of the fibers used or the like.

As shown in FIG. 2c, to fix the FRP pipe 12 to the metal pipe 11, the FRP pipe 12 is incorporated into the metal pipe 11. Then, for example, the metal pipe 11 is spun to be deformed plastically and reduced in diameter, thereby fixing the FRP pipe 12 to the metal pipe 11 (the portion reduced in diameter is indicated by reference numeral 13 in the figure).

Figure 3A:
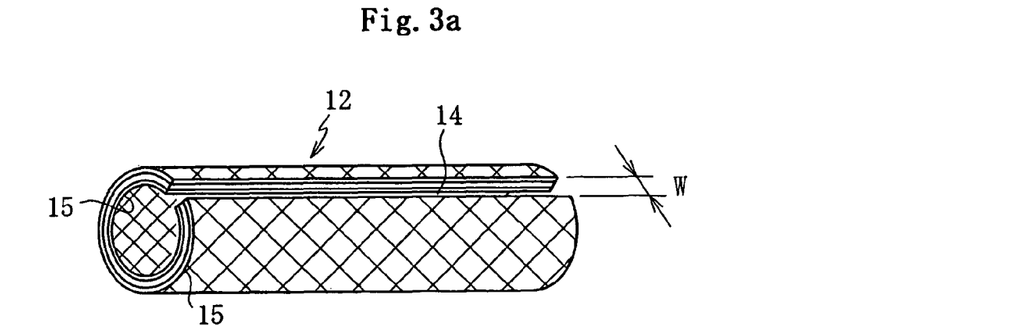
FIG. 3a is a perspective view illustrating an FRP pipe provided with a slit.
Figure 3B:
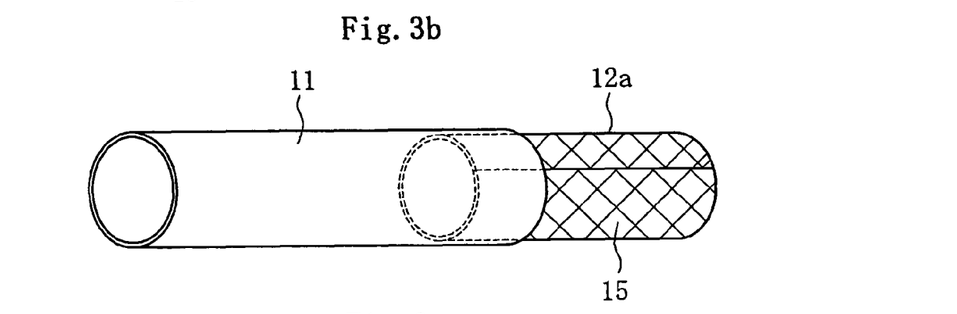
FIG. 3b is a perspective view illustrating a step in which an FRP pipe with a slit is press-fitted into a metal pipe.
Figure 3C:
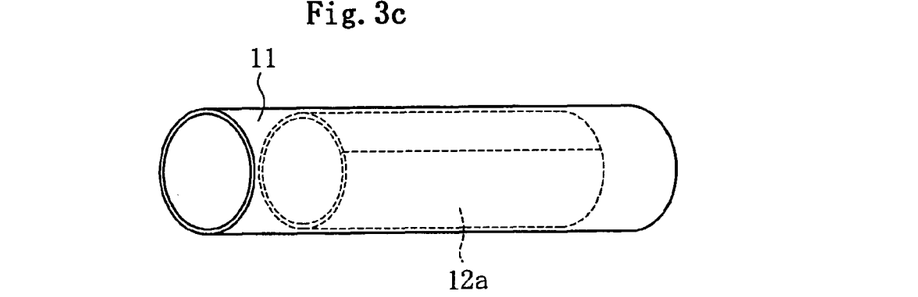
FIG. 3c is a perspective view illustrating a metal pipe in which an FRP pipe with a slit has been press-fitted.

As shown in FIGS. 3a to 3c, it is also possible to use an FRP pipe 12a having a slit 14 formed in the axial direction. Consider a case where the FRP pipe 12a having the slit 14 formed in the axial direction is incorporated into the metal pipe 11, while being reduced in diameter. In this case, it is easy to elastically deform the FRP pipe 12a by the width W of the slit in the circumferential direction (see FIGS. 3d and 3e). Accordingly, the assembly of the FRP pipe 12a is drastically made easier in comparison with the press-fitting of an FRP pipe having no slit.

That is, since the outer diameter of the FRP pipe and the inner diameter of the metal pipe have their respective tolerances of size, it is necessary to match the dimensions with each other to control press-fit pressures in the process for the pipes each having a simple cylindrical shape. In contrast to this, the FRP pipe 12a having the slit 14 eliminates the aforementioned matching and permits a reduced press-fit pressure.

Figure 3D:
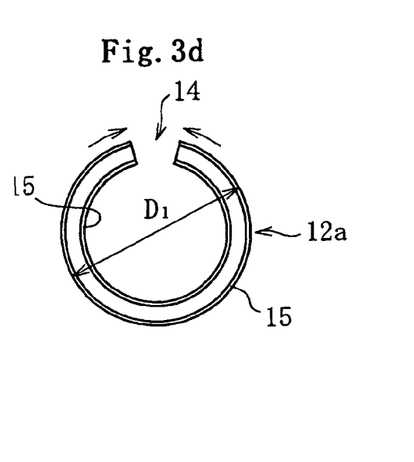
FIG. 3d is an end view of an FRP pipe with a slit in a natural state.
Figure 3E:
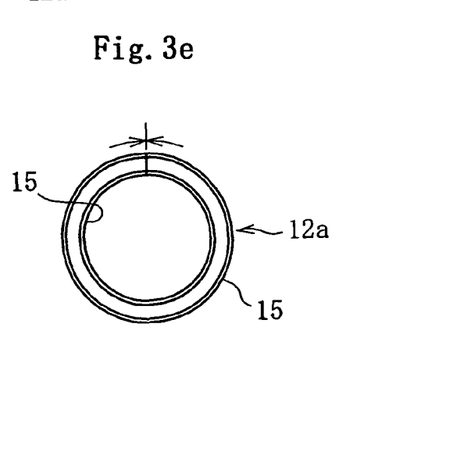
FIG. 3e is an end view of an FRP pipe with a slit, the pipe being reduced in diameter.

The slit width W is set to the range from 0.01% to 40% of the outer circumference of the FRP pipe in its natural state. A slit width W less than 0.01% of the outer circumference of the FRP pipe may require matching even when the FRP pipe is elastically deformed in the circumferential direction. On the contrary, a slit width W greater than 40% of the outer circumference of the FRP pipe may increase the amount of imbalance in rotation, thereby causing a problem of runouts at high speed rotations.

The cross-sectional shape of the slit 14 is not limited to any particular one, but will be advantageous if the shape can be continuously formed by pultrusion process. In addition, to form the slit 14, the FRP pipe 12 may be first formed in the shape of a cylinder and then provided with the slit 14 by cutting.

Figure 4A:
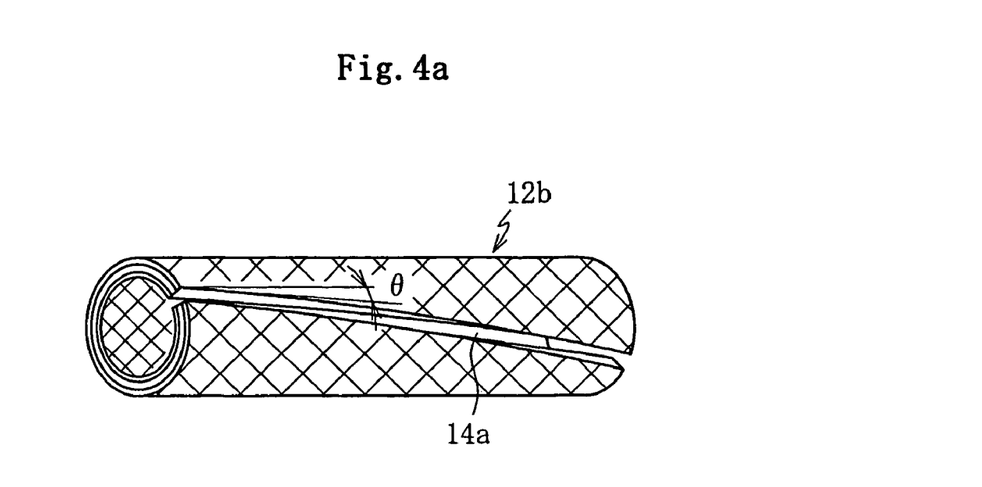
FIG. 4a is a perspective view illustrating an FRP pipe with a slit formed at a bias angle.
Figure 4B:
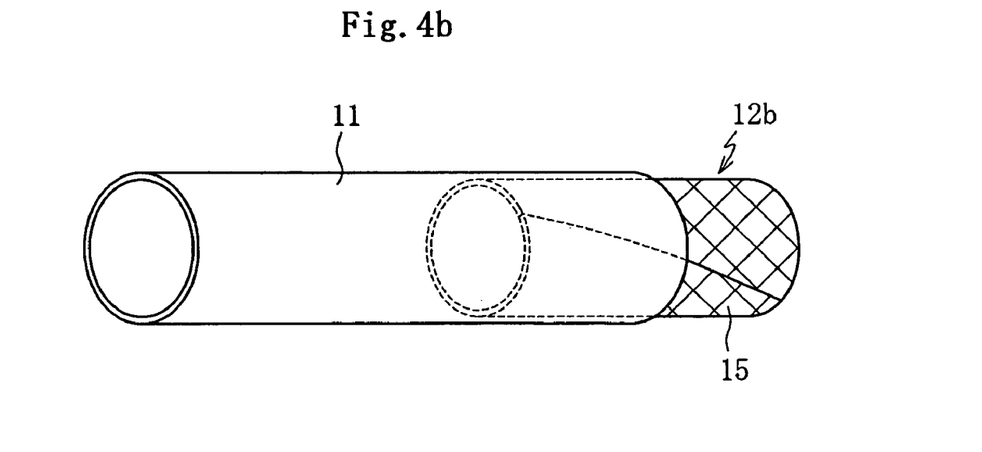
FIG. 4b is a perspective view illustrating a step in which an FRP pipe with a slit formed at a bias angle is press-fitted into a metal pipe.
Figure 4C:
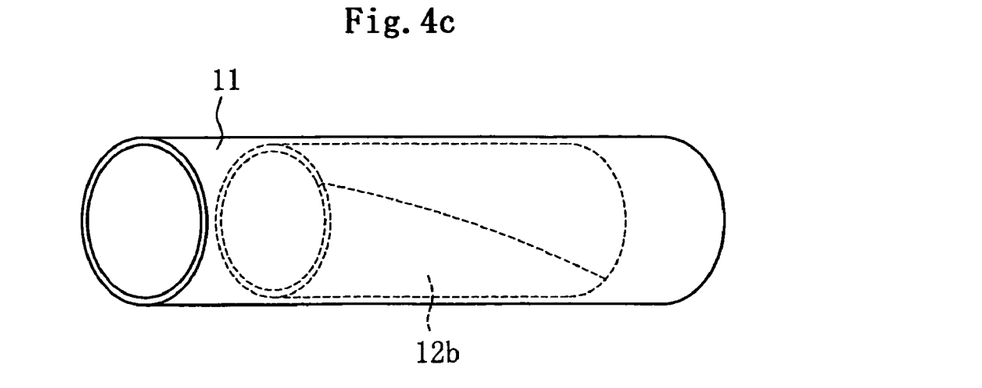
FIG. 4c is a perspective view illustrating a metal pipe in which an FRP pipe with a slit formed at a bias angle has been press-fitted.

As shown in FIGS. 4a to 4c, to form a slit continuously by pultrusion process, it is possible to provide an FRP pipe 12b with a slit 14a formed at a bias angle θ with respect to the axial direction. In this case, the bias angle θ is preferably within ±30 degrees. A slit 14a having a bias angle θ greater than 30 degrees causes the tow to be aligned parallel to that direction. Accordingly, this would make it difficult to improve the flexural rigidity of the power transmission shaft that has incorporated an FRP pipe of fibers having a high elasticity.

The FRP pipe 12 having the slit 14 is so formed as to have an outer diameter that is greater than the inner diameter of the metal pipe 11, so that the FRP pipe 12 has an apparent outer diameter less than the inner diameter of the metal pipe 11 when having been elastically deformed (reduced in diameter) by the slit width W in the circumferential direction. In this case, it is preferable that the value of $D_1/D_2$ is greater than 1 and less than or equal to 1.3, where $D_1$ is the outer diameter of the FRP pipe 12 having the slit 14 (see FIG. 3d) and $D_2$ is the inner diameter of the metal pipe 11 (see FIG. 1a).

With the value of $D_1/D_2$ being less than or equal to 1, the outer diameter of the FRP pipe 12 having the slit 14 is not greater than the inner diameter of the metal pipe 11, leaving a gap therebetween. On the contrary, with the value of $D_1/D_2$ being greater than 1.3, a deformation caused by a reduction in diameter of the FRP pipe 12 would be beyond the elastic deformation region in some cases, thereby raising a problem of cracks.

After having been incorporated into the metal pipe 11, the FRP pipe 12 is to expand therein to restore its original outer diameter given upon its formation. This force acts to press the outer circumference of the FRP pipe 12 against the inner circumference of the metal pipe 11, thereby causing the FRP pipe 12 to be fixed therein. This fixing force is advantageous when the metal pipe 11 is deformed by spinning or by means of adhesive.

Upon being reduced in thickness and increased in diameter by pultrusion process, the FRP pipe 12 is spun to align its fiber bundles in the longitudinal direction of the FRP pipe 12 and provided with circumferential reinforced fiber sheet 15 on the outer and inner surface layers of the FRP pipe 12 (see FIG. 1b and other figures). The fiber bundles are spun and aligned in the longitudinal direction of the pipe, thereby allowing for making full use of the mechanical properties of the fibers used for the FRP pipe 12 at maximum efficiency. In addition to this, the circumferential reinforced fiber sheet 15 is provided on the outer and inner surface layers of the FRP pipe 12, thereby making it possible to prevent tensile strain of the pipe from developing in the circumferential direction.

Upon being reduced in thickness and increased in diameter by pultrusion process, the fibers are impregnated with a non-hardened matrix resin and then hardened continuously while those multiple tows are being overwound, thereby making it possible to efficiently manufacture a pipe-shaped molded product having a uniform cross-section. The FRP pipe 12 can be formed in advance by sheet wrapping. However, the pultrusion process may be used to significantly reduce the loss of material upon manufacturing, thus providing a better cost advantage in comparison with the sheet wrapping method.

To form the FRP pipe 12 having a layered structure by pultrusion process, the FRP pipe 12 can be overwound but may be preferably provided with twenty or less layers in number. This is because a molded product having layers of more than twenty would make the preparation work considerably complicated, thereby compromising its mass productivity.

The fibers that form the FRP pipe 12 have desirably a low density and a high elasticity in order to provide an increased first-order flexural resonance frequency for the power transmission shaft. Such fibers include PAN-based carbon fibers, pitch-based carbon fibers, silicon carbide fibers, alumina fibers, boron fibers, glass fibers, para-based aramid fibers (such as Kevlar made by DU PONT), and metal fibers (of steel, aluminum alloy, titanium alloy, copper, and tungsten).

It is also possible to employ two or more types of fibers in combination to reduce the cost of the FRP pipe 12. Such fibers as have a high specific elasticity can greatly contribute to the reduction of weight. For example, to use for a power transmission shaft, the PAN-based carbon fibers are preferable in terms of specific strength while the pitch-based carbon fibers are preferable in terms of specific elasticity. From the viewpoint of cost reduction, it is also acceptable to employ a hybrid type of fibers such as these carbon fibers combined with each other or these carbon fibers combined with glass fibers.

For the PAN-based carbon fibers, the diameter of a fiber is preferably within the range from 1 μm to 20 μm or more preferably from 5 μm to 8 μm. For fibers of diameter less than 1 μm, acrylic fibers employed as raw material are costly. In addition to this, it is difficult to control the process of forming carbon fibers by carbonization. This in turn increases the cost of the fibers, thus making it difficult to provide shafts at low cost. For fibers of diameter larger than 20 μm, it is difficult to provide fibers having a high elasticity. On the other hand, for the pitch-based carbon fibers, mesophasepitch-based carbon fibers are preferably employed which are long fibers and has a high elasticity.

The fibers, which constitute the fiber bundles of the FRP pipe 12 that are spun and aligned in the longitudinal direction, have preferably a tensile elasticity of 196 GPa or more, more preferably 245 GPa or more. The fibers having a tensile elasticity of less than 196 GPa would not sufficiently contribute to the improvement of the cross-sectional second-order moment of inertia of the FRP pipe 12 even when the FRP pipe 12 is increased in thickness because the outer diameter thereof remains unchanged. Accordingly, it is difficult to increase the first-order flexural resonance frequency of the power transmission shaft.

Now, consider the tensile elasticity of the fibers that form the circumferential reinforced fiber sheet 15 provided on the outer and inner surface layers of the FRP pipe 12. It is necessary for the fibers to have a tensile elasticity sufficiently enough to prevent the circumferential tensile strain that occurs on a surface of the FRP pipe 12a having the slit 14, the surface being opposite to the slit with respect to the center of the pipe, when the FRP pipe 12a is reduced in diameter. In this context, it is desirable for the fibers that form the circumferential reinforced fiber sheet 15 to have a high tensile elasticity of at least 58.8 GPa. Such fibers include the PAN-based carbon fibers, pitch-based carbon fibers, glass fibers, and aramid fibers.

The circumferential reinforced fiber sheet 15 may take the form such as of a randomly chopped mat or a continuously strand mat. On the other hand, the circumferential reinforced fiber sheet 15 requires the basis weight (FAW) within the range from 100 $g/m^2$ to 600 $g/m^2$, or preferably from 200 $g/m^2$ to 400 $g/m^2$. In addition to this, the circumferential reinforced fiber sheet 15 also requires a thickness within the range from 0.05 mm to 1.0 mm, or preferably from 0.1 mm to 0.8 mm.

For the fiber sheet 15 of the basis weight (FAW) less than 100 $g/m^2$ or of thickness less than 0.05 mm, it may be difficult to form a piece of continuous fiber sheet 15 by pultrusion process due to a fracture caused by a tensile force. A piece of fiber sheet 15 of the basis weight (FAW) more than 600 $g/m^2$ tends to become wrinkled upon its formation by pultrusion process. On the other hand, for a piece of fiber sheet 15 of thickness greater than 1.0 mm, it is difficult to continuously accommodate the fiber sheet 15 in the outer or inner mold upon its formation by pultrusion process.

No restriction is imposed on the arrangement of the circumferential reinforced fiber sheet 15 of the FRP pipe 12 and any arrangement is acceptable. In other words, the fiber sheet 15 needs not always to be provided on both the outer and inner surface layers. That is, the fiber sheet 15 may be disposed on either the outer surface layer or the inner surface layer, or only on the vicinity of a surface opposite to the slit with respect to the center of the pipe, as long as the fiber sheet 15 can substantially prevent the occurrence of cracks.

Incidentally, instead of the circumferential reinforced fiber sheet 15 provided on the outer and inner surface layers of the FRP pipe 12, the filament winding of reinforcement fibers such as glass fibers is also acceptable which is formed at a certain angle to the longitudinal direction at the same time of the formation or after the pultrusion process. However, the filament winding employed together with the pultrusion process would require a special apparatus and thus affect productivity. Accordingly, it is advantageous to use the circumferential reinforced fiber sheet 15.

It is also possible to fix the FRP pipe 12 to the metal pipe 11 with adhesive. When a pipe is press-fitted into another, both pipes having a simple cylindrical shape, the adhesive may be removed upon press-fitting. Accordingly, there may be left no adhesive between the inner circumference of the metal pipe 11 and the outer circumference of the FRP pipe 12.

Figure 5A:
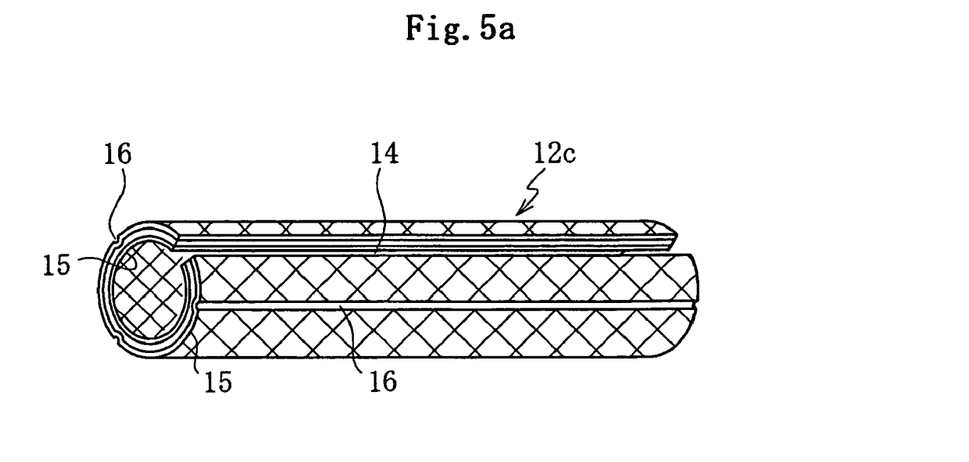
FIG. 5a is a perspective view illustrating an FRP pipe provided with axial grooves and a slit.
Figure 5B:
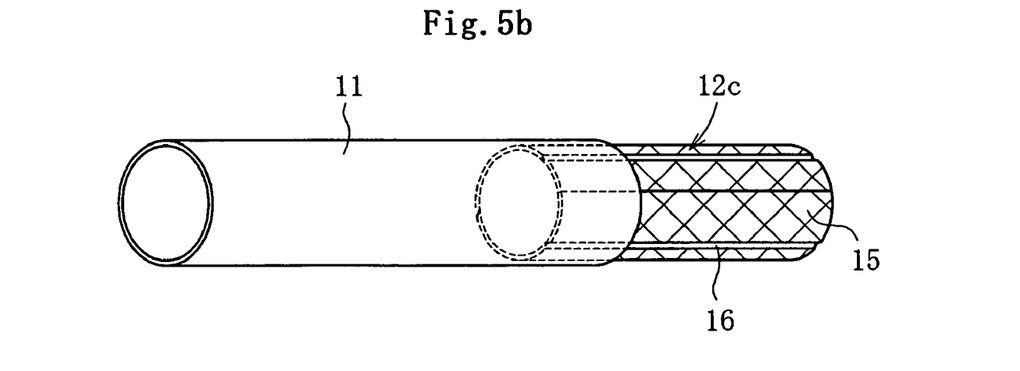
FIG. 5b is a perspective view illustrating a step in which an FRP pipe with axial grooves and a slit is press-fitted into a metal pipe.
Figure 5C:
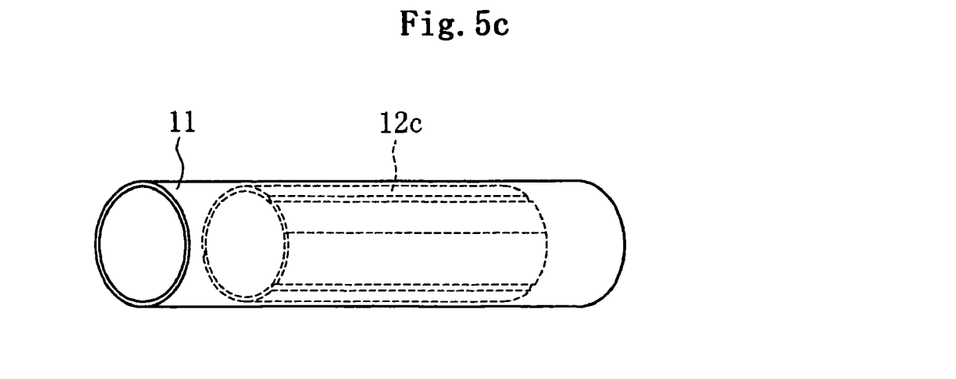
FIG. 5c is a perspective view illustrating a metal pipe in which an FRP pipe with axial grooves and a slit has been press-fitted.
Figure 6A:
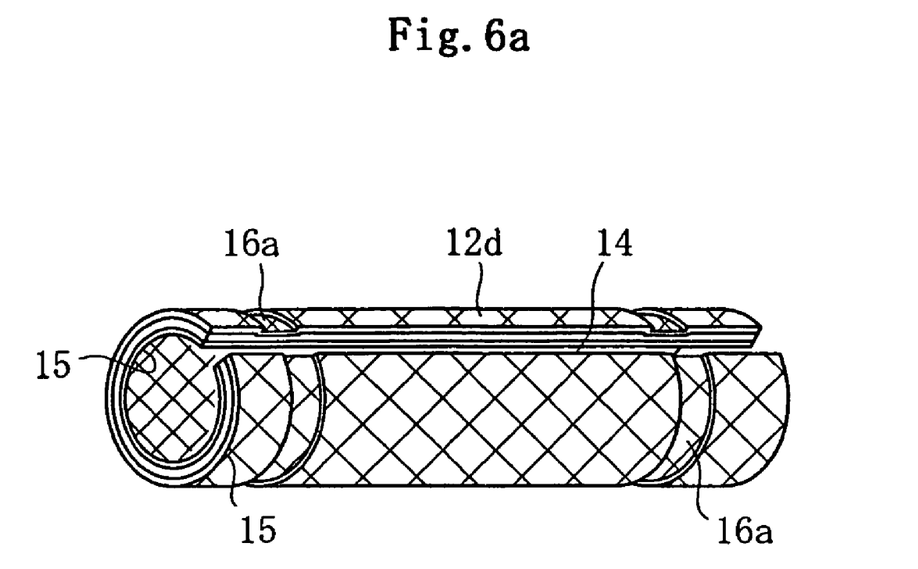
FIG. 6a is a perspective view illustrating an FRP pipe with circumferential grooves and a slit.
Figure 6B:
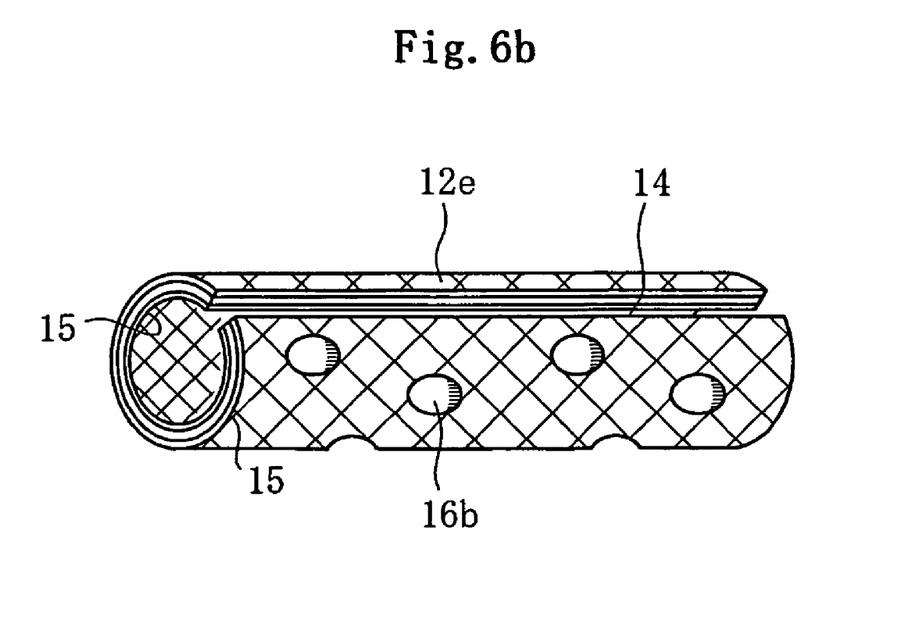
FIG. 6b is a perspective view illustrating an FRP pipe with a slit and recessed portions.
Figure 7A:
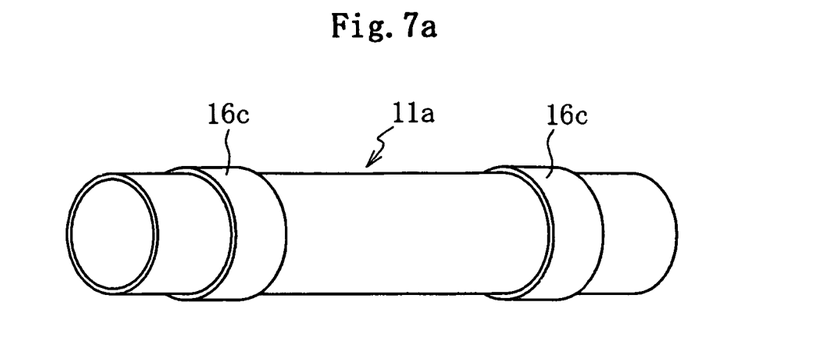
FIG. 7a is a perspective view illustrating a metal pipe having circumferential grooves formed on the inner circumferential surface.
Figure 7B:
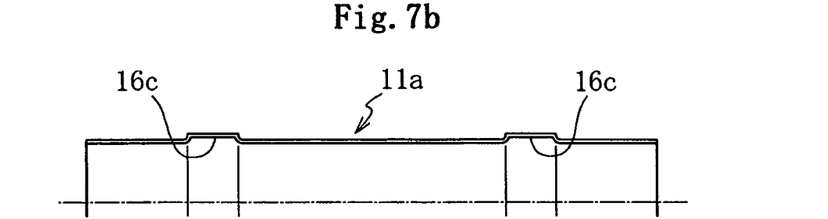
FIG. 7b is a longitudinal sectional view illustrating the metal pipe of FIG. 7a, FIG. 7c is a perspective view illustrating a metal pipe in which an FRP pipe has been inserted.
Figure 7C:
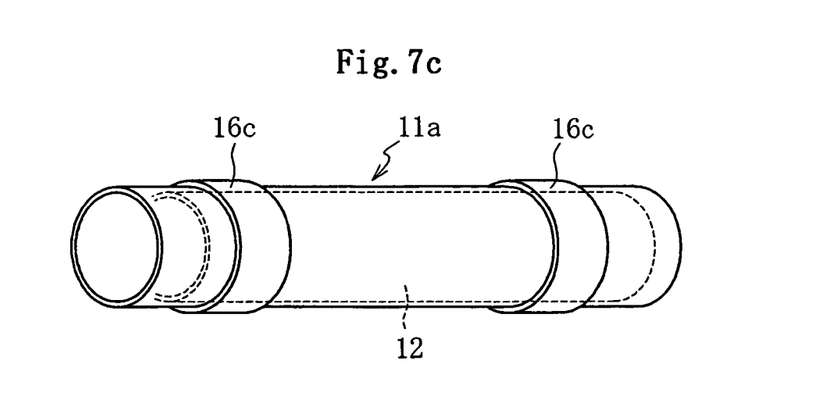
Figure 7D:
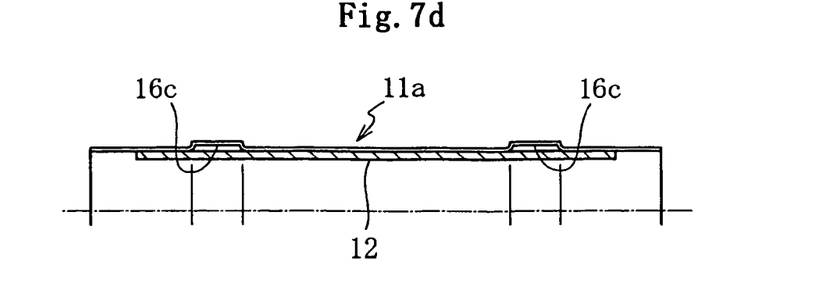
FIG. 7d is a longitudinal sectional view of FIG. 7c.

As shown in FIGS. 5a to 5c, to overcome this problem, on the outer circumference of the FRP pipe 12c are provided axial grooves 16 serving as an adhesive-retaining recessed portion between the metal pipe 11 and FRP pipe 12c after having been assembled. Such adhesive-retaining recessed portions include other structures such as circumferential grooves 16a (see FIG. 6a) and recessed portions 16b (see FIG. 6b). Alternatively, as shown in FIGS. 7a to 7d, such circumferential grooves 16c as will serve as an adhesive-retaining recessed portion after assembly may be formed plastically in advance on the inner circumferential surface of a metal pipe 11a.

In general, no restriction is imposed on the adhesive to be used as long as the adhesive can bond metal and FRP together. For example, all the metal-FRP adhesives can be used which are described in "Science and Reality of Adhesive" published by Kabushiki Kaisha Kobunshi, and "How to Select Adhesive for High Performance" published Kabushiki Kaisha Gijutsu Hyoronsha. More desirable adhesives include a structural adhesive which is an epoxy-based adhesive of a solution type containing aluminum powder or iron oxide powder and which enables resistance welding which is typified by spot welding. To correct the balance of the shaft later in its manufacturing process, this weldable adhesive allows balance pieces to be welded onto the shaft without any problem. To cure adhesive, the heat can be used which is applied to the outer circumference of the metal pipe for painting by carbonization.

No particular restriction is imposed on thermosetting resin to be used as a matrix for the FRP pipe 12. In general, it is possible to use thermosetting resins such as epoxy resin, phenol resin, unsaturated polyester resin, vinyl ester resin of bisphenol A type or novolak type, urethane resin, alkyd resin, xylene resin, melamine resin, furan resin, silicon resin, and polyimide resin. In terms of strength, it is preferable to use the epoxy resin or vinyl ester resin.

To use the epoxy resin for the matrix, the resistance to heat of the epoxy resin after having been cured may be 60° C. or more in terms of the glass transition temperature, preferably 80° C. or more. For the power transmission shaft of a vehicle in which the ambient temperature is on the order of 60° C., an epoxy resin having a resistance to heat of less than 60° C. after having been cured may cause a serious problem, and thereby cannot be used as the matrix.

It is also possible to use a modified epoxy resin which contains rubber particles in an epoxy resin to form a sea-island structure and which is thereby provided with resistance to impact. It is also possible to use a modified epoxy resin having principal chains or side chains modified in chemical structure. In this case, it is possible to provide damping properties for the resulting power transmission shaft. It is also possible to use an epoxy resin which is provided with electrical conductivity by distributing fillers such as electrically conductive carbon black or metal powder in the epoxy resin.

To use the vinyl ester resin for the matrix, the glass transition temperature after it has been cured may be 60° C. or more, preferably 70° C. or more. For the power transmission shaft of a vehicle in which the ambient temperature is on the order of 60° C., a vinyl ester resin having a glass transition temperature of less than 60° C. after it has been cured may be reduced in elasticity, resulting in a drop in flexural rigidity of the FRP pipe 12. Suppose that an FRP pipe 12 to be used for insertion is manufactured using the vinyl ester resin as the matrix by pultrusion process. In this case, an inner mold release agent can be contained in the resin to improve its formidability.

To improve the strength of the interface between the matrix and the fibers, a surface of reinforcement fibers to be used may be subjected to ozone oxidation or ultraviolet radiation to activate the surface, while a silane coupling agent or titanium coupling agent may be used for wet processing to improve affinity. Alternatively, a highly reactive functional group site may be formed on the surface of the fibers and then cured together with a thermosetting matrix resin to thereby provide firm adhesion having a chemical bond.

No particular restriction is imposed on the type of metal for use with the metal pipe 11 as long as the metal permits machining such as boring, welding, friction welding, or press-fitting. However, preferable metals include iron, aluminum, copper, titanium, tungsten, and nickel. Furthermore, an alloy of any of these metals may also be used.

The dimensions of the power transmission shaft made up of the metal pipe 11 and the FRP pipe 12 are determined by the flexural natural frequency required of the power transmission shaft. In other words, to satisfy the necessary flexural natural frequency only with the metal pipe 11, the pipe is to be increased in diameter and weight. For example, to overcome this problem, the thickness of the metal pipe 11 may be designed to satisfy only the necessary static torsional strength, and an FRP pipe 12 having a high elasticity may be inserted into the metal pipe 11 so as to satisfy the flexural natural frequency required for the outer circumference thereof. This makes it possible to reduce the outermost diameter and weight of the shaft.

Such a metal pipe 11 may have a length of 100 mm or more and 6000 mm or less, preferably 200 mm or more and 6000 mm or less. For a metal pipe 11 less than 100 mm in length and having a diameter which satisfies the required static torsional strength, the metal pipe 11 has already a high rigidity sufficiently enough to eliminate inserting an FRP pipe 12 into the metal pipe 11. For a metal pipe 11 greater than 6000 mm in length, it is difficult to install the pipe in a vehicle even when the vehicle is a truck.

It is preferable to determine the axial length of the FRP pipe 12 being inserted into the metal pipe 11 such that the value of FL/PL is within the range from 0.1 to 1.0, where PL is the length of the metal pipe 11 (see FIG. 1a) and FL is the length of the FRP pipe 12 (see FIG. 1b). With the value of FL/PL being less than 0.1, it is difficult to achieve the necessary flexural rigidity even when an FRP pipe 12 having a high specific elasticity is incorporated into the metal pipe 11. With the value of FL/PL being greater than 1.0, the FRP pipe 12 is longer than the metal pipe 11. That is, this makes it impossible to employ a metal-to-metal joint method appropriately at least on one side of the resulting power transmission shaft.

The metal pipe 11 is preferably within the range from 1 mm to 10 mm in thickness. A metal pipe 11 having a thickness of 1 mm or less may be damaged when carried or the FRP pipe 12 is inserted therein. This also makes it difficult to design the inner diameter and thickness of the metal pipe 11 to satisfy only the static torsional strength required of the power transmission shaft for use with a vehicle. Even when the metal pipe 11 can be designed, the pipe is increased in diameter. A metal pipe 11 of thickness more than 10 mm is too heavy to be employed as the shaft for use with a passenger car, thus making it impossible to achieve the object of reducing weight.

The metal pipe 11 has preferably an outer diameter within the range from 10 mm to 250 mm, preferably from 15 mm to 230 mm, more preferably from 20 mm to 200 mm. A metal pipe 11 having an outer diameter of less than 10 mm cannot satisfactorily transmit the torque required by a passenger car even with the FRP pipe 12 inserted in the metal pipe 11. On the other hand, a metal pipe 11 of outer diameter greater than 250 mm would raise a space problem that the pipe interferes with other parts inside the vehicle.

It is also preferable that the value of $t_2/t_1$ is within the range of 0.01 to 10, where $t_1$ is the thickness of the metal pipe 11 (see FIG. 1a) and $t_2$ is the thickness of the FRP pipe 12 (see FIG. 1b). With the value of $t_2/t_1$ being less than 0.01, it is difficult to provide a flexural rigidity that satisfies the necessary flexural natural frequency even when an FRP pipe 12 having a high specific elasticity is incorporated into the metal pipe 11. With the value of $t_2/t_1$ being greater than 10, an improvement can be expected in flexural rigidity when the FRP pipe 12 is incorporated into the metal pipe 11. However, this would cause the relative amount of FRP being used to increase, thereby raising a problem of increasing manufacturing costs.

The resulting power transmission shaft provided in this way has sufficient reliability in torsional strength and joint strength required for a vehicle, being light in weight and compact. Furthermore, since a metal surface is available on the outer circumference, it is possible to correct the balance of the shaft or paint the shaft in the existing line and process. Furthermore, the power transmission shaft provides the same performances as those of the current propeller shaft in terms of resistance to hitting stones (or resistance to chipping) during running with passengers in the vehicle and resistance to corrosion due to salt water. In particular, consider the case where the FRP pipe is formed by pultrusion process. In this case, in comparison with the sheet wrapping method, the step of winding the prepreg sheet, the shrink tape and the step of winding the shrink tape, and the step of curing prepreg sheet (or heat treatment) can be eliminated. This makes it possible to considerably reduce the loss of material upon manufacturing, thereby realizing the reduction of manufacturing costs of the power transmission shaft.

Now, examples are explained below as a typical example in which the power transmission shaft is applied to as a propeller shaft of a vehicle, however, the present invention is not limited to these examples. In these examples, the hammering method was employed to evaluate flexural rigidity. The first-order flexural natural frequency of a shaft being supported at both ends, 130 Hz or more, was employed as the passing criterion to judge the measured values.

In Example 1, the pultrusion process was used to form an FRP pipe (70 mm in outer diameter and 3 mm in thickness) while the tow of PAN-based carbon fibers of elasticity 255 kN/mm$^2$, "PYROFIL TRH50 made by Mitsubishi Rayon Co., Ltd.," and a continuous strand mat employing glass fibers of elasticity 72.3 kN/mm$^2$, "CSM#300 made by Asahi Fiber Glass Co.," were being impregnated with a vinyl ester resin, "8250H made by Japan U-Pica Co., Ltd."

The glass fiber sheet 15 was arranged on the outer and inner surface layers of the FRP pipe 12, while carbon fibers were spun and aligned in the axial direction. A slit of 0.8 m in length and 9 mm in width was provided on the FRP pipe, which was then elastically deformed in the circumferential direction. Then, the FRP pipe was inserted into a steel pipe (of STKM13B, 70 mm in outer diameter, 1.4 mm in thickness, and 0.9 m in length) down to the middle portion. Then, the FRP pipe with the slit was allowed to expand in the circumferential direction to be fixed inside the metal pipe.

Thereafter, a stub shaft was welded to both ends to prepare an intermediate shaft for the propeller shaft. The resulting intermediate shaft provided a first-order flexural natural frequency of 140 Hz when measured by the hammering method with both ends being supported. This value tells that the propeller shaft can be satisfactorily employed for practical use.

In Example 2, the pultrusion process was used to form an FRP pipe (70 mm in outer diameter and 3 mm in thickness) while the tow of PAN-based carbon fibers of elasticity 255 kN/mm$^2$, "PYROFIL TRH50 made by Mitsubishi Rayon Co., Ltd.," and a continuous strand mat employing glass fibers of elasticity 72.3 kN/mm$^2$, "CSM#300 made by Asahi Fiber Glass Co.," were being impregnated with a vinyl ester resin, "8250H made by Japan U-Pica Co., Ltd."

The glass fiber sheet was arranged on the outer and inner surface layers of the FRP pipe, while carbon fibers were spun and aligned in the axial direction. A slit of 0.8 m in length and 9 mm in width was provided on the FRP pipe, which was then elastically deformed in the circumferential direction. Then, the FRP pipe was inserted into a steel pipe (of STKM13B, 70 mm in outer diameter, 1.4 mm in thickness, and 0.9 m in length) down to the middle portion. Then, the FRP pipe was adhered to the metal pipe with an adhesive, "Penguin Cement #1081L made by Sunstar Engineering Inc."

Thereafter, a stub shaft was welded to both ends to prepare an intermediate shaft for the propeller shaft. The resulting intermediate shaft provided a first-order flexural natural frequency of 143 Hz when measured by the hammering method with both ends being supported. This value tells that the propeller shaft can be satisfactorily employed for practical use.

In a comparative example, an FRP pipe was spun in the same way as in the aforementioned examples without using the glass fiber sheet. A slit of width 9 mm was provided on the FRP pipe, which was then elastically deformed in the circumferential direction. When the FRP pipe was then inserted into the steel pipe, cracks occurred on the surface of the FRP pipe. The cracks prevented the FRP pipe from expanding inside the metal pipe, thereby making it impossible to adhere the FRP pipe to the metal pipe.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A fiber reinforced plastic pipe reduced in thickness and increased in diameter by pultrusion process, comprising
   a fiber bundle containing fibers aligned in a longitudinal direction, and
   a circumferential reinforced fiber sheet provided both on an outer surface layer and on an inner surface layer thereof, wherein
   the pipe has a slit, capable of being reduced in diameter along the circumference, provided in the longitudinal direction, such that said fiber reinforced plastic pipe can be inserted into a metal pipe, and
   wherein the circumferential reinforced fiber sheet prevents tensile strain from developing in the circumferential direction of the pipe.

2. The fiber reinforced plastic pipe according to claim 1, wherein
   a tensile elasticity of fibers forming said fiber bundle is 196 GPa or more.

3. The fiber reinforced plastic pipe according to claim 1, wherein
   a tensile elasticity of fibers forming said circumferential reinforced fiber sheet is 58.8 GPa or more.

4. The fiber reinforced plastic pipe according to claim 1, wherein
   a basis weight (FAW) of said circumferential reinforced fiber sheet is in the range of 100 g/m² to 600 g/m².

5. The fiber reinforced plastic pipe according to claim 1, wherein
   a thickness of said circumferential reinforced fiber sheet is in the range of 0.05 mm to 1.0 mm.

6. A power transmission shaft comprising a metal joint element and a metal pipe jointed to each other, wherein
   the shaft further comprises a fiber reinforced plastic pipe inserted into said metal pipe, said fiber reinforced plastic pipe being reduced in thickness and increased in diameter by pultrusion process, comprising a fiber bundle containing fibers aligned in a longitudinal direction, and a circumferential reinforced fiber sheet provided both on an outer surface layer and on an inner surface layer thereof,
   wherein the circumferential reinforced fiber sheet prevents tensile strain from developing in the circumferential direction of the pipe.

7. A power transmission shaft comprising a metal joint element and a metal pipe jointed to each other, wherein
   the shaft further comprises a fiber reinforced plastic pipe inserted into said metal pipe, said fiber reinforced plastic pipe being reduced in thickness and increased in diameter by pultrusion process, comprising a fiber bundle containing fibers aligned in a longitudinal direction, and a circumferential reinforced fiber sheet provided both on an outer surface layer and on an inner surface layer, the pipe having a slit, capable of being reduced in diameter along the circumference, provided in the longitudinal direction,
   wherein the circumferential reinforced fiber sheet prevents tensile strain from developing in the circumferential direction of the pipe.

8. The power transmission shaft according to claim 7, wherein the slit has a width of 0.01% or more and 40% or less of the outer circumference thereof in a natural state.

9. The power transmission shaft according to claim 7 or 8, wherein said slit has a bias angle within ±30 degrees with respect to an axial direction of said fiber reinforced plastic pipe.

10. The power transmission shaft according to claim 7, wherein a value of $D_1/D_2$ is greater than 1 and equal to 1.3 or less, where $D_1$ is an outer diameter of said fiber reinforced plastic pipe and $D_2$ is an inner diameter of said metal pipe.

11. The power transmission shaft according to claim 6 or 7, wherein
    a tensile elasticity of fibers forming said fiber bundle is 196 GPa or more.

12. The power transmission shaft according to claim 6 or 7, wherein
    a tensile elasticity of fibers forming said circumferential reinforced fiber sheet is 58.8 GPa or more.

13. The power transmission shaft according to claim 6 or 7, wherein
    a basis weight (FAW) of said circumferential reinforced fiber sheet is in the range of 100 g/m² to 600 g/m².

14. The power transmission shaft according to claim 6 or 7, wherein
    a thickness of said circumferential reinforced fiber sheet is in the range of 0.05 mm to 1.0 mm.

15. The power transmission shaft according to claim 6 or 7, wherein said fiber reinforced plastic pipe has a layered structure of 20 layers or less.

16. The power transmission shaft according to claim 6 or 7, wherein a value of FL/PL is 0.1 or more and 1.0 or less, where PL is a length of said metal pipe and FL is a length of said fiber reinforced plastic pipe.

17. The power transmission shaft according to claim 6 or 7, wherein a value of $t_2/t_1$ is 0.01 or more and 10 or less, where $t_1$ is a thickness of said metal pipe and $t_2$ is a thickness of said fiber reinforced plastic pipe.

18. The power transmission shaft according to claim 6 or 7, wherein said fiber reinforced plastic pipe is fixed to said metal pipe by reducing said metal pipe in diameter along the outer circumference by plastic-working, with said fiber reinforced plastic pipe being inserted in said metal pipe.

19. The power transmission shaft according to claim 6 or 7, wherein said fiber reinforced plastic pipe is fixed to said metal pipe with an adhesive.

20. The power transmission shaft according to claim 19, wherein
    a recessed portion for accommodating adhesive is provided at least on any one of an outer circumference of said fiber reinforced plastic pipe or an inner circumference of said metal pipe.

* * * * *